April 15, 1952 E. J. DEDMAN 2,592,869
EGG CRATE LID
Filed June 29, 1950

E. J. Dedman
INVENTOR
BY Chsnow &Co.
ATTORNEYS.

Patented Apr. 15, 1952

2,592,869

UNITED STATES PATENT OFFICE 2,592,869

EGG CRATE LID

Eber Jack Dedman, Shreveport, La.

Application June 29, 1950, Serial No. 171,026

1 Claim. (Cl. 217—56)

This invention relates to a lid for an egg crate.

By way of background, it may be noted that conventionally, lids for egg crates are nailed thereon, and in general, a plurality of nails is driven in each end of a lid and into the end brace of the egg crate. As a result, to provide access to the contents of the crate the lid has to be ripped therefrom.

By reason of this arrangement, only rarely can a lid be used a second time. Obviously, this represents a considerable expense, in view of the great number of lids which must ultimately be manufactured for application to a single crate. It can be fairly stated, I believe, that one egg crate will wear out twenty-five lids, under present practice.

It is, accordingly, an important object of the present invention to provide a lid for an egg crate which can be reused indefinitely, to an extent where one lid will in fact last far longer than the crates to which it is applied.

Another important object is to achieve the result stated immediately above while yet holding down the cost of manufacture so that the lid formed in accordance with the invention can be manufactured at a very reasonable cost, said cost being substantially lower than the total cost of all the lids formed in accordance with present practice which would be used and worn out during the life of a single lid formed in accordance with the invention.

Still another object is to achieve not only a saving in actual manufacturing costs, but also a considerable saving in time, by the provision of a lid which can be swiftly applied to an egg crate for the purpose of securely covering the same, with speed and facility, and which can be removed with equal speed and facility, in substantially less time than was previously required for nailing or ripping off lids.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings

Figure 1:
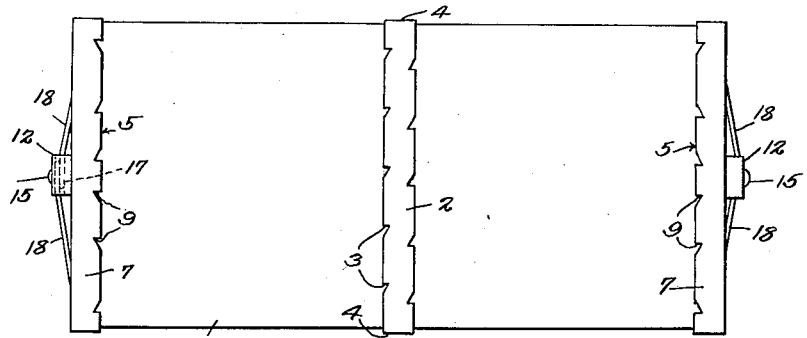
Figure 1 is a top plan view of an egg crate lid formed in accordance with the present invention.
Figure 6:
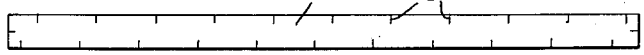
Fig. 6 is a plan view of the blank used in forming the center strip.

Referring to the drawings in detail, the lid includes a flat thin rectangular wood body 1, and for the purpose of preventing splitting or warping of the thin wood material from which the body is constructed, and also for preventing crushing of the body by metal ties or straps passed there-around, I provide the center strip 2 illustrated in blank in Fig. 6 and illustrated as applied to the body 1 in Fig. 1.

As seen from Fig. 6, the center strip 2 is an elongated strip of material, this being preferably formed from a length of bendable metal.

Figure 2:
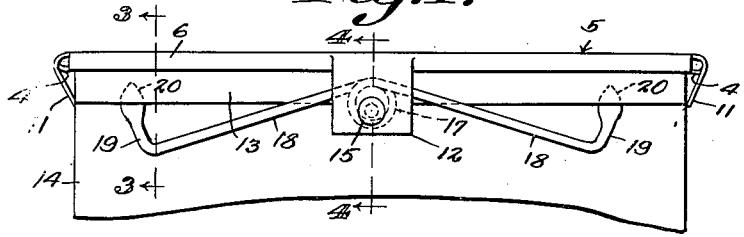
Fig. 2 is a fragmentary end elevational view of an egg crate and my lid applied thereto.

Spaced through the entire periphery of the strip 2 are short inwardly extended slits defining attaching cleats 3 that are integral with the center strip, and which can be turned down as shown in Fig. 1 so as to impale the body 1 and cause the center strip to be fixedly and permanently attached to said body. The center strip 2 extends transversely of the body intermediate the opposite ends of said body, and is formed to a length somewhat greater than the width of the body, so that projecting end portions of the center strip are turned under and fixedly secured to the under side of the body by driving of their cleats thereinto. The folded under end portions are allowed to project beyond the opposite side edges of the body 1 a short distance, as readily seen from Fig. 1, so as to define side loops 4 (see Fig. 2) which are adapted to receive wire ties, not shown, that can be reeved therethrough, where a center tie is found necessary or desirable.

Figure 5:
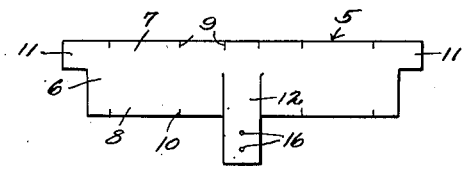
Fig. 5 is a top plan view of a metal blank used in forming the end strip of the lid.

On each end of the body 1 is permanently mounted an end strip generally designated 5. This is formed from a material similar to that used for the center strip, and in blank, appears as shown in Fig. 5.

The end strip 5 is formed to a width sufficient to permit the folding thereof along a line extending substantially centrally and longitudinally of the end strip, so as to cause the end strip to be folded over the end edge of the body 1 as at 6, one of the folded over portions 7 overlying the end of the body while the other portion 8 underlies said body, the portion 7 having the cleats 9 sunk into the body, while the portion 8 has the cleats 10 driven upwardly into the body. The attaching cleats are formed by short inwardly extended slits spaced peripherally of the blank, exactly as in the case of the center strip 2.

It will thus be seen that there is provided, in effect, a metal shoe of U-shaped cross section that fits over the end edge of the body 1 and extends fully from side to side of the body at each end thereof, this shoe having spaced attaching cleats formed integrally therewith and driven into the body both from above and below, thus to provide a strong, easily applied, and inexpensive structure.

At opposite ends of the upper portion 7 of said shoe, there are provided the ears 11, and these are extended downwardly into engagement with opposite sides of the crate on which the lid is to be mounted, so as to prevent lateral deviation of the lid relative to the crate.

Figure 4:
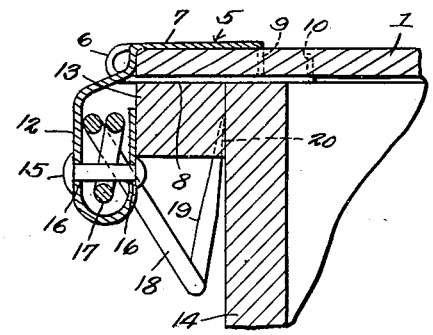
Fig. 4 is a view similar to Fig. 3, but taken at the center of the end portion of the crate and lid, on line 4—4 of Fig. 2.

Formed medially between the opposite ends of the shoe 5 is a depending ear or pivot bracket 12, shown in blank in Fig. 5, this being folded upwardly as best shown in Fig. 4, so as to provide a depending U-shaped bracket formed integrally upon the medial portion of the shoe, that extends downwardly so as to overhang one end of the crate. In this connection, and as readily seen from Figs. 2 and 4, the crate is provided with the usual end brace 13 of wood material, extending from side to side of the crate at each end thereof, and being located at the top of the crate. The end wall of the crate is designated 14 and is also of conventional construction, since the present invention does not relate to any change whatsoever in the conventional crate, but only in the lid to be applied to said crate.

Secured to the depending center bracket 12 is a rivet 15 that extends through registering openings 16 of said bracket, the rivet 15 comprising a pivot pin that passes through the center spring loop 17 of a strong wire spring. As seen from Fig. 4, the spring loop 17 is mounted with sufficient looseness upon its pivot to permit rotatable movement or rocking of the spring integral with said loop.

Figure 3:
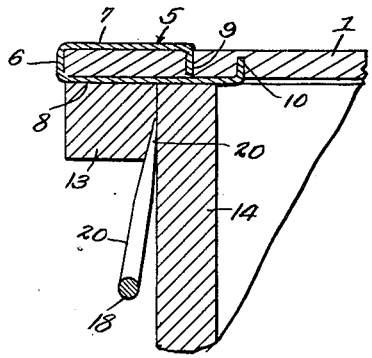
Fig. 3 is a fragmentary vertical section taken longitudinally through the end portion of the crate and lid mounted thereon, adjacent one side of the crate and lid, on line 3—3 of Fig. 2.

Considering the formation of said spring, extending in opposite directions from the center loop 17 are the spring arms 18 that extend towards opposite sides of the lid and which are inclined downwardly towards said opposite sides, the outer ends of said spring arms 18 terminating short of the opposite sides of the lid and being formed integrally with upturned upwardly diverging short fingers 19 the upper ends of which are formed as flattened wedges 20 which by manual pressure are readily forced upwardly between the brace 13 and end wall 14 of the crate, as best seen from Fig. 3.

Where a lid has been previously applied to the crate, as would be the usual situation, the application of the first lid to said crate would in general cause the formation of spaces or recesses adapted to receive the wedge ends 20 of subsequent lids applied to the same crate. Even in application of the first lid to a particular crate, no particular manual force is required to cause the wedges 20 to wedge in the position shown in Fig. 3, since these wedges are quite sharp and in effect are driven readily into their appointed location by pulling the arms 18 downwardly against the action of the spring loop 17 and releasing the arms, so as to cause the wedges to be swung upwardly with considerable force to effect the connection.

An important characteristic of the present invention resides in the rockable mounting of the spring, this rocking on a center pivot. The purpose of this is to adapt the lid to deformed crate or brace constructions. As will be appreciated, the egg crates and lids are rather roughly fabricated and assembled, and additionally, cheap wood material is used, which tends readily to warp. Considering the rough usage which is an additional factor, it often happens that crate and lid deformations will occur. The rockable spring mounting compensates for this, since the spring can be rocked bodily to accommodate itself to a brace which may be inclined out of the horizontal, with the opposite ends of the spring still exerting a uniform pressure directing the wedges 20 into place.

It should also be noted, as seen from Figs. 1 and 4, that the spring arms 18 are extended towards the respective end walls 14, so as to cause the fingers 19 and wedges 20 to be positioned directly under the joint between the braces 13 and said end walls, so that on release of the spring arms, the wedges 20 will in effect be forced upwardly along the surface of the end wall to find the wedging locations automatically.

A further characteristic believed to be of considerable importance resides in the fact that the construction devised is quite inexpensive and permits the manufacture of the lids at a cost sufficiently low to make them commercially feasible. This characteristic is inherent in the provision of end strips and center strips which are integral stampings formed from inexpensive sheet metal material, these stampings forming not only the body portions of the strips, but also forming attaching cleats and tie loops in the case of the center strip, and attaching cleats, side stops, a pivot bracket, and an end shoe, in the case of the end strips 5.

What is claimed is:

An egg crate lid comprising a generally flat body; end shoes permanently mounted upon opposite ends of said body, each shoe being formed from a one-piece metal stamping folded longitudinally and centrally to define a shoe of U-shaped cross section adapted to be fitted over opposite end edges of said body; attaching cleats formed integrally upon said shoe and spaced from side to side of said body, said cleats being driven into the upper and bottom surfaces of said body; a pivot bracket formed integrally upon the medial portion of said shoe and overhanging one end of a crate on which said lid is mounted, said pivot bracket being of U-shaped cross section; a pin extending between opposite walls of said bracket; and means adapted to releasably engage opposite ends of said crate, said means comprising a one-piece spring formed of stout wire material and mounted upon each pin, each spring including a center spring loop loosely fitted over the associated pin for rocking of the spring upon said pin, each spring additionally including spring arms extending in opposite directions from said loop and being inclined downwardly towards opposite sides of said crate, there being formed on the free ends of said spring arms upwardly extended fingers having flattened wedge ends proportioned to engage between the end wall and cross brace of a crate to which said lid is applied.

EBER JACK DEDMAN.

REFERENCES CITED

The following references are of record in the file of this patent:

UNITED STATES PATENTS

| Number | Name | Date |
| --- | --- | --- |
| 1,429,134 | Gunn | Sept. 12, 1922 |
| 1,436,440 | Fox | Nov. 21, 1922 |
| 2,297,865 | Behlen | Oct. 6, 1942 |